(12) United States Patent
Huang

(10) Patent No.: US 7,675,269 B2
(45) Date of Patent: Mar. 9, 2010

(54) CIRCUIT AND METHOD FOR BATTERY CHARGING AND DISCHARGING PROTECTION

(75) Inventor: Hung Sen Huang, Hsinchu (TW)

(73) Assignee: Broadcom Corporation, Irvine, CA (US)

( * ) Notice: Subject to any disclaimer, the term of this patent is extended or adjusted under 35 U.S.C. 154(b) by 212 days.

(21) Appl. No.: 11/592,179

(22) Filed: Nov. 3, 2006

(65) Prior Publication Data

US 2008/0106235 A1    May 8, 2008

(51) Int. Cl.
*H02J 7/24* (2006.01)
(52) U.S. Cl. ............... 320/158; 320/118; 320/125; 320/134; 320/160; 324/433
(58) Field of Classification Search .......... 320/158; 713/320
See application file for complete search history.

(56) References Cited

U.S. PATENT DOCUMENTS

| | | | | |
|---|---|---|---|---|
| 4,885,523 A * | 12/1989 | Koenck | ...... | 320/131 |
| 5,027,294 A * | 6/1991 | Fakruddin et al. | ...... | 713/300 |
| 5,621,298 A * | 4/1997 | Harvey | ...... | 320/134 |
| 5,764,035 A * | 6/1998 | Lee | ...... | 320/160 |
| 5,779,162 A * | 7/1998 | Noakes et al. | ...... | 239/690.1 |
| 5,783,930 A * | 7/1998 | Albert et al. | ...... | 320/140 |
| 5,825,165 A * | 10/1998 | Kitching et al. | ...... | 323/282 |
| 6,075,339 A * | 6/2000 | Reipur et al. | ...... | 320/110 |
| 6,084,382 A * | 7/2000 | Hite | ...... | 320/116 |
| 6,094,034 A * | 7/2000 | Matsuura | ...... | 320/134 |
| 6,160,381 A * | 12/2000 | Peterzell | ...... | 320/134 |
| 6,300,744 B1 * | 10/2001 | Shum | ...... | 320/137 |
| 6,396,243 B2 * | 5/2002 | Odaohhara | ...... | 320/116 |
| 6,518,731 B2 * | 2/2003 | Thomas et al. | ...... | 320/136 |
| 6,583,602 B2 * | 6/2003 | Imai et al. | ...... | 320/118 |
| 6,771,049 B2 * | 8/2004 | Kawagoe et al. | ...... | 320/136 |
| 6,850,039 B2 * | 2/2005 | Popescu | ...... | 320/134 |
| 6,920,404 B2 * | 7/2005 | Yamanaka | ...... | 702/63 |
| 7,030,591 B2 * | 4/2006 | Stellberger | ...... | 320/134 |
| 7,215,096 B2 * | 5/2007 | Miura et al. | ...... | 320/134 |
| 7,285,936 B2 * | 10/2007 | Ohnuma et al. | ...... | 320/150 |
| 7,315,151 B2 * | 1/2008 | Thompson et al. | ...... | 323/223 |
| 7,345,455 B2 * | 3/2008 | Jones | ...... | 320/148 |
| 7,365,952 B2 * | 4/2008 | Sato | ...... | 361/90 |
| 7,463,009 B2 * | 12/2008 | Chang et al. | ...... | 320/121 |
| 7,486,051 B2 * | 2/2009 | Zhang | ...... | 320/136 |
| 7,518,338 B2 * | 4/2009 | Wang et al. | ...... | 320/125 |
| 7,579,811 B2 * | 8/2009 | Sato et al. | ...... | 320/134 |
| 2001/0007417 A1 * | 7/2001 | Kitagawa | ...... | 320/128 |
| 2002/0079865 A1 * | 6/2002 | Thomas et al. | ...... | 320/136 |
| 2003/0030413 A1 * | 2/2003 | Saeki et al. | ...... | 320/136 |
| 2003/0085621 A1 * | 5/2003 | Potega | ...... | 307/18 |
| 2003/0141847 A1 * | 7/2003 | Fujiwara | ...... | 320/134 |
| 2005/0093512 A1 * | 5/2005 | Mader et al. | ...... | 320/116 |

(Continued)

*Primary Examiner*—Edward Tso
*Assistant Examiner*—Arun Williams
(74) *Attorney, Agent, or Firm*—Sterne, Kessler, Goldstein & Fox P.L.L.C.

(57) ABSTRACT

A method to detect the presence of battery protection circuits in any battery powered product. The major advantage of the method is to make the battery voltage very smooth during the charging process. The proposed circuit can give a good prediction of protection switching turn on time. This can provide the battery powered system work smoothly by avoiding any battery voltage discontinuity. The proposed invention addresses the issue of deep discharge and provides a solution through a discharge test procedure.

16 Claims, 5 Drawing Sheets

U.S. PATENT DOCUMENTS

| | | | |
|---|---|---|---|
| 2005/0212484 A1* | 9/2005 | Denning et al. | 320/128 |
| 2005/0218902 A1* | 10/2005 | Restaino et al. | 324/433 |
| 2005/0242782 A1* | 11/2005 | Kadouchi et al. | 320/150 |
| 2006/0181244 A1* | 8/2006 | Luo et al. | 320/128 |
| 2006/0238166 A1* | 10/2006 | Wanibuchi | 320/128 |
| 2007/0063674 A1* | 3/2007 | Voorwinden | 320/128 |
| 2007/0075684 A1* | 4/2007 | Liu et al. | 320/128 |
| 2007/0210755 A1* | 9/2007 | Gangstoe et al. | 320/128 |
| 2008/0074081 A1* | 3/2008 | Croman et al. | 320/134 |
| 2008/0116851 A1* | 5/2008 | Mori | 320/134 |

* cited by examiner

CIRCUIT AND METHOD FOR BATTERY CHARGING AND DISCHARGING PROTECTION

BACKGROUND OF THE INVENTION

1. Field of the Invention

The present invention is directed to detection of battery protection circuits in an electronic device. More specifically it is directed towards outputting a smooth battery voltage to a load during the process of charging an electronic device, including mobile devices.

2. Related Art

The current battery charging technology does not detect the level of charge already present in a battery, before the charging process begins. Thus, due to an unknown level difference between the actual battery voltage and the assumed battery voltage level which is initially supplied to the battery, there is often a high probability of the battery output voltage suffering a discontinuity. This can result in improper functioning of the load device. For example, in case of a cellular phone, such a voltage discontinuity at the output of a battery due to sudden surge in charge voltage can lead to dropped calls or a discontinuity in communication.

The conventional battery charger circuits also do not provide a solution for what is known in the art as deep discharge of the battery. Thus, there is need for the battery charger to have an inbuilt test strategy to determine the level of battery charge.

The battery chargers in the market cannot detect the protection circuits inside the battery very well. As a result, there is no decision possible with respect to whether a battery should be trickle charged or charged at full voltage. This may lead to overcharging or undercharging the battery. Both of these situations not only effect the battery life but may also be detrimental to the load life or the functions it performs.

BRIEF SUMMARY OF THE INVENTION

The invention is directed towards a method and apparatus to detect the presence of battery protection circuits in a battery. The invention aims to substantially obviate one or more of the problems and disadvantages of the related art.

In one embodiment, there is provided a protector Integrated Circuit (IC) inside the battery which controls the turning on and off of two transistors which control the current flow to the battery. In a realistic scenario, the battery can discharge to a level which is very low as compared to the under voltage ratio defined for the battery. This is known as the Deep Discharge Scenario. If the battery is in the deep discharge zone and a charger is then connected to it, it will start charging at a high voltage level. As soon as the battery level crosses the under voltage level, there is a sudden drop in the output of the charger. The charger now drops to the battery voltage level, which is now equal to the under voltage level. This sudden drop in the voltage level causes discontinuities in the output of the battery.

To avoid discontinuity in the output of the battery, or to at least minimize it, the battery charger must determine the battery charge prior to the commencement of the charging process. To help the charger determine the correct battery voltage to be supplied, the invention tests when the battery protection circuit is enabled. In another embodiment, this test procedure is in-built in the Power Management Unit (PMU) of which the battery protection circuit may be a part of.

BRIEF DESCRIPTION OF THE DRAWINGS/FIGURES

The present invention will be readily understood by the following detailed description in conjunction with the accompanying drawings, wherein like reference numerals designate like structural elements and in which.

DETAILED DESCRIPTION OF THE INVENTION

Figure 1:
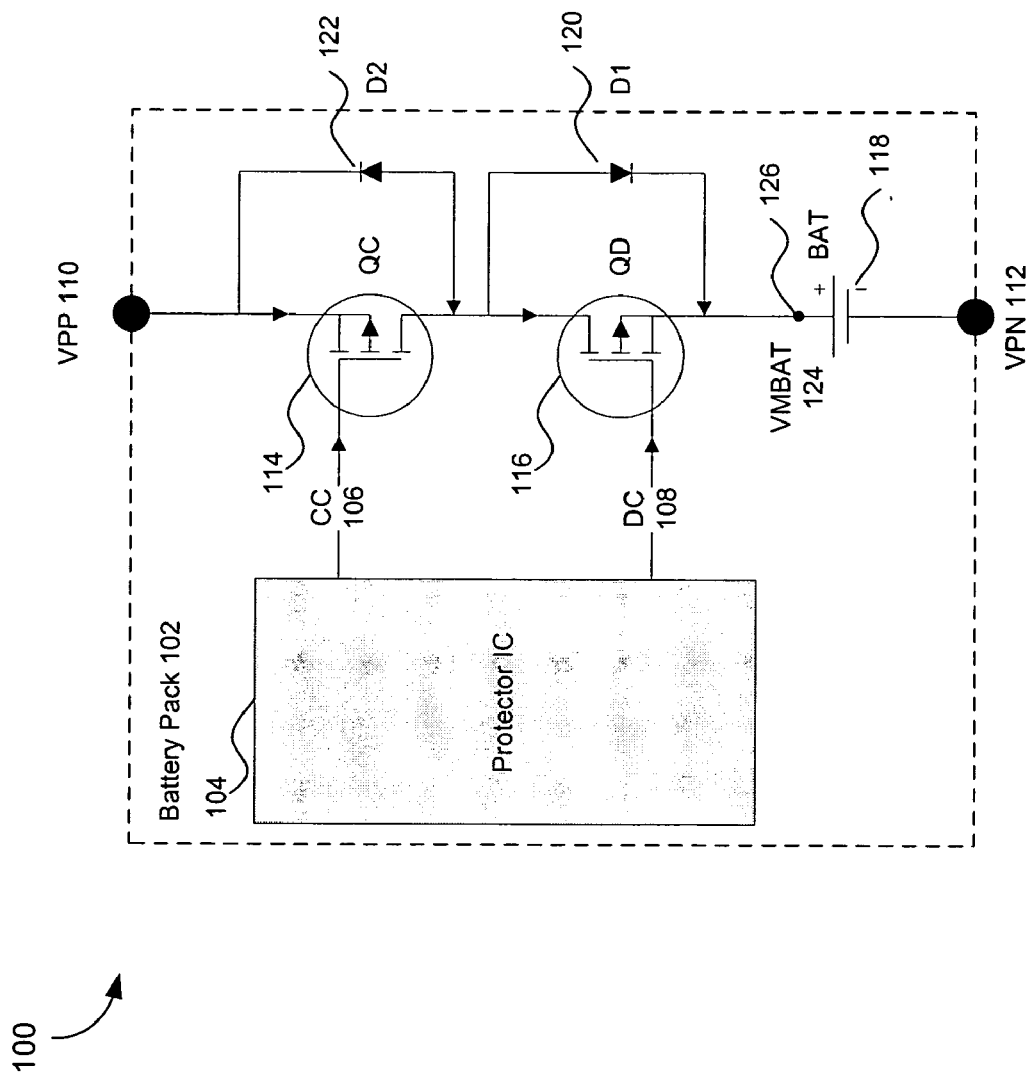
FIG. 1 illustrates a battery protector circuit.

FIG. 1 illustrates a battery protection circuit 100, according to one embodiment of the invention. Battery protection circuit 100 shows a battery pack 102 with a peak voltage output $V_{PP}$ 110 and a low voltage output $V_{PN}$ 112. The battery pack 102 includes, among other elements, a protector IC 104 connected to a charge current path CC 106 and a discharge current path DC 108. The charge current path CC 106 is connected to the gate of a first transistor 114. The discharge current path DC 108 is connected to the gate of a second transistor 116.

The source of the first transistor 114 is connected to the peak voltage output $V_{PP}$ 110 and the drain of the first transistor 114 is connected to the drain of the second transistor 116. Between the drain and the source of the first transistor 114, a first diode 122 is connected such that the cathode of the first diode 122 is connected to the source of the first transistor 114 and the anode of the first diode 122 is connected to the drain of the first transistor 114.

As follows from what is described immediately above, the drain of the second transistor 116 is connected to the drain of the first transistor 114. The source of the second transistor 116 is connected to the positive terminal of a battery 118 at node 126. Between the collector and the source of the second transistor 116, a second diode 120 is connected such that the cathode of the second diode 120 is connected to the source of the second transistor 116 and the anode of the second diode 120 is connected to the drain of the second transistor 116.

Negative terminal of the battery 118 is connected to the low voltage output $V_{PN}$ 112. The Battery Protection Circuit 100 functions according to a voltage $V_{MBAT}$ 124 across the positive and the negative terminals of the battery 118. The first transistor 114 and the second transistor 116 provide protection to the battery 118 from overcharging or going into a deep discharge mode, depending upon the voltage $V_{MBAT}$ 124 of the battery 118. The protector IC 104 provides the logic to control the turn ON and turn OFF of the first transistor 114 and the second transistor 116.

The Battery Protection circuit 100 serves as a communication port between the battery 118 and a mobile device (not shown in any figure), of which the battery 118 and the Battery Protection Circuit 100 is a part and to which the battery 118 supplies power.

Figure 2A:
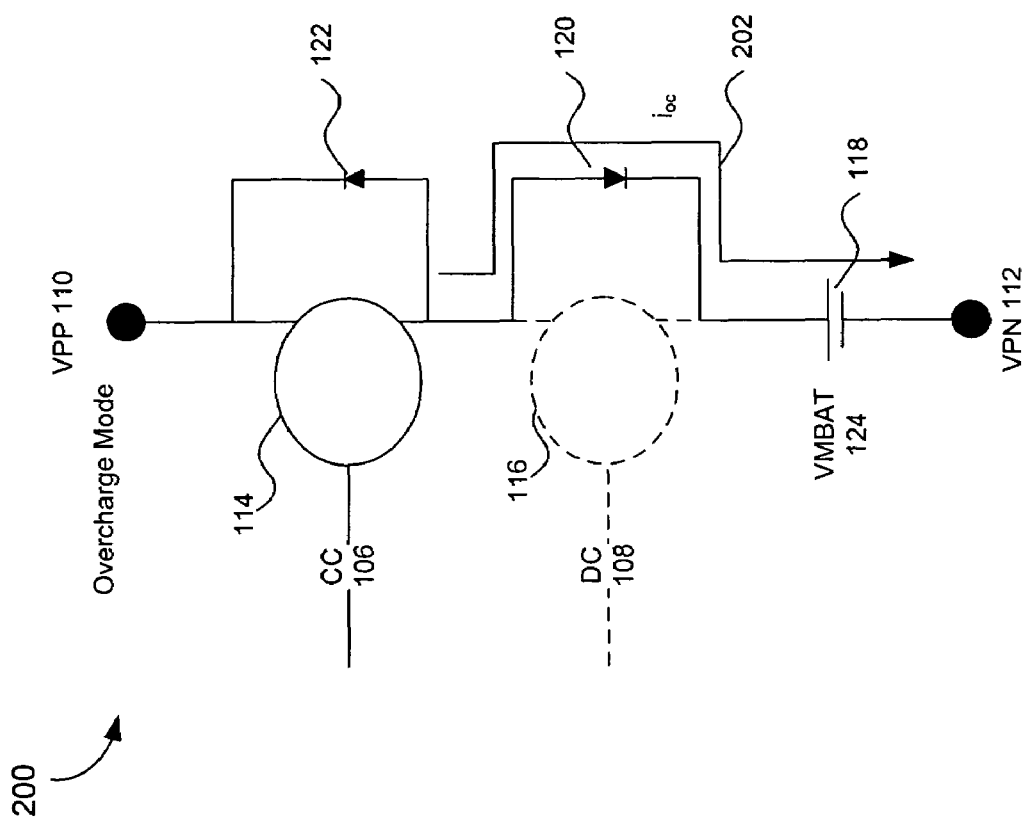
FIG. 2A illustrates a charging mode of the battery protection circuit.

FIG. 2A illustrates a charging mode of Battery Protector Circuit 100 of FIG. 1 (and thus how an overcharge mode is avoided). An overcharge mode is defined as the condition when the voltage $V_{MBAT}$ 124 across the terminals of the battery 118 is greater than an over-voltage threshold $V_{OV}$. Overcharging should be avoided since it can produce hydrogen in the battery, which can be very dangerous. According to one embodiment, the over-voltage threshold $V_{OV}$ is set equal to 4.242 Volts, but other voltages are contemplated. In such a condition if the peak value of the voltage $V_{MBAT}$ 124 is below $V_{OV}$, the protector IC 104 (not shown in FIG. 2A) will turn ON the first transistor 114 by means of the charge current path CC 106. As a result, a current $i_{oC}$ will flow along the path 202, as shown in FIG. 2A, thus charging the battery. Since the protector IC 104 does not assert any signal on the discharge current path DC 108, the second transistor 116 is turned OFF. The current $i_{OC}$ flows through the second diode 120, which is forward biased. When $V_{MBAT}$ 124 goes above $V_{OV}$ the battery is at full capacity and first transistor 114 will be turned off to prevent further charging.

Figure 2B:
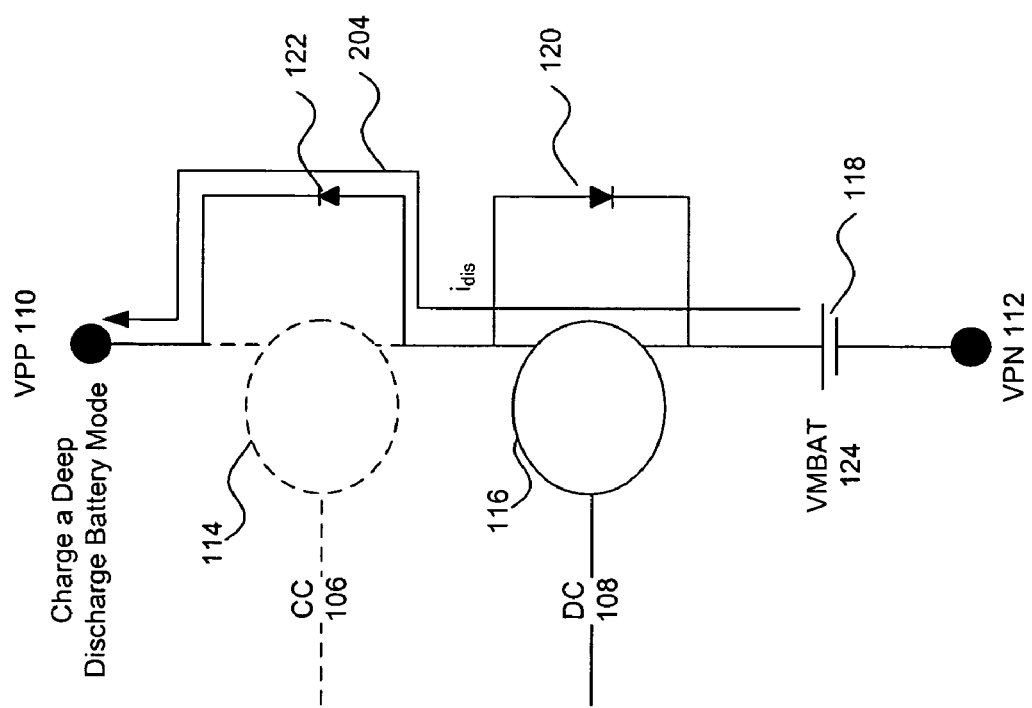
FIG. 2B illustrates a discharging mode of the Battery Protection Circuit.

FIG. 2B shows illustrates a discharging mode of Battery Protector Circuit 100 of FIG. 1 (and thus how a deep discharge mode is avoided). The protector IC 104 of FIG. 1 will turn ON the second transistor 116 by means of the discharge current path 108. As a result, a current $i_{dis}$ will flow along the path 204, as shown in FIG. 2B. Since the protector IC does not assert any signal on the charge current path CC 106, the first transistor 114 is turned OFF. The current $i_{dis}$ flows through the first diode 122, which is forward biased. Thus, the battery can discharge when the second transistor is ON.

A deep discharge mode is defined as the condition when the voltage $V_{MBAT}$ 124 across the terminals of the battery 118 is less than an under-voltage threshold $V_{UV}$. The value of the under-voltage threshold $V_{UV}$ is usually set to a very low value. When the voltage $V_{MBAT}$ 124 falls below the under-voltage threshold $V_{UV}$, the battery 118 is in a deep discharge zone. The battery must be recharged when the battery enters the deep discharge zone. In such a circumstance, second transistor 116 must be turned OFF to prevent further discharging.

FIGS. 2A and 2B illustrate the charging and discharging operations of the battery 118. For example, if the protector IC 104 of FIG. 1 detects that the voltage $V_{MBAT}$ 124 is too low, it disables the second transistor 116 thereby enabling the path 202 of the circuit, so that the battery 118 can charge. Similarly, if the protector IC 104 of FIG. 1 detects that the voltage $V_{MBAT}$ 124 is too high, it disables the first transistor 114 thereby enabling the path 204 so that the battery 118 can discharge.

Figure 3:
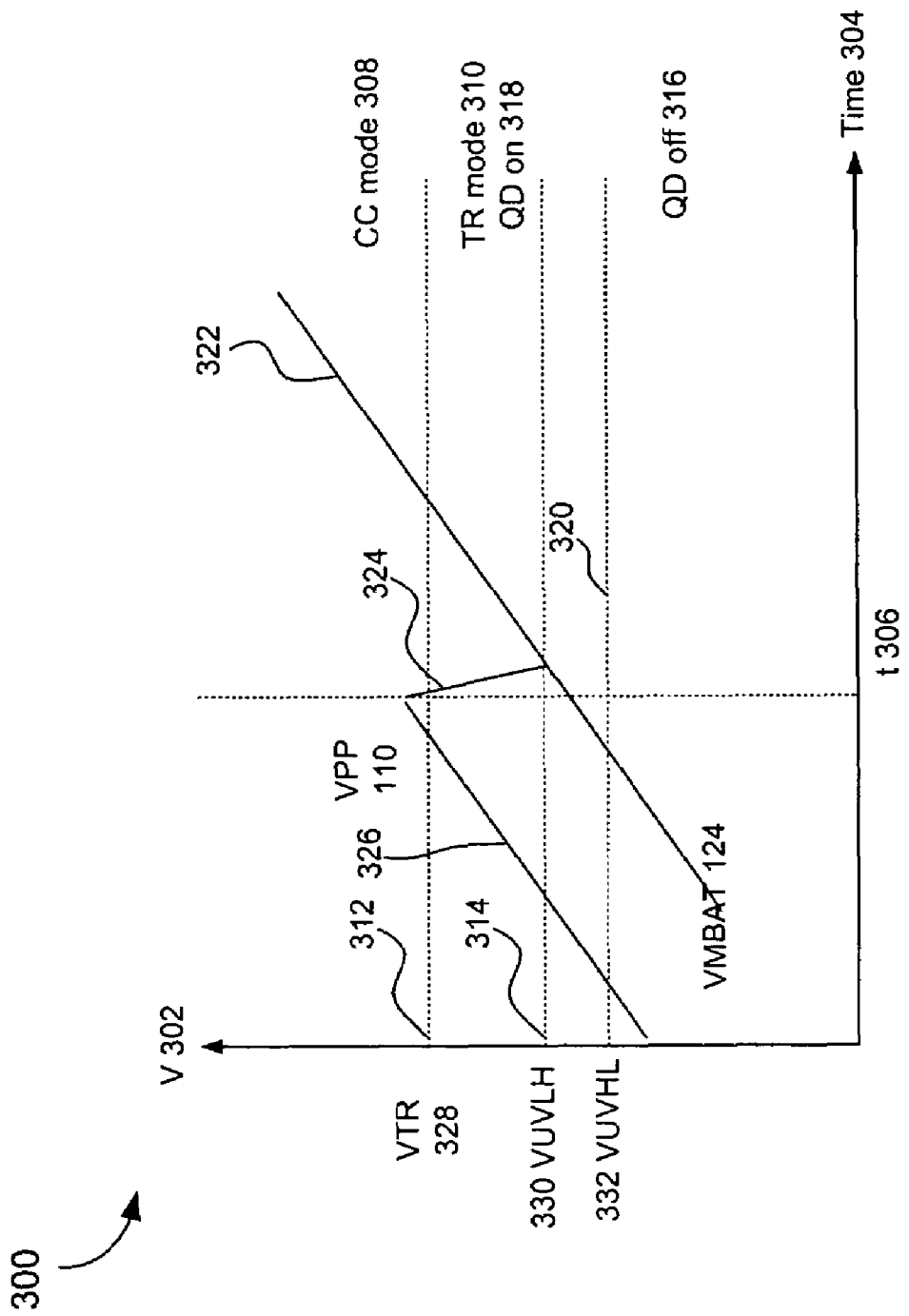
FIG. 3 illustrates the voltage drops with respect to time in a Deep Discharge Scenario.

FIG. 3 shows a voltage versus time plot 300 for the battery 118 of FIG. 1. The Voltage V 302 is shown to vary with respect to Time 304 in a manner shown by curve 326, curve 324 and curve 322. Before the battery 118 of FIG. 1 is set to charging, the exact value of the voltage of the battery 118 is unknown. It could be anywhere from 0 volts to $V_{UVHL}$ 332. The region of the voltage versus time plot 300 between the abscissa and the line 320 is known as the deep discharge zone. In the deep discharge zone, the transistor 116 of FIG. 1 is OFF as shown by QD off 316. In such a situation, the battery 118 will start charging to the peak voltage output $V_{PP}$ 110.

The value of the peak voltage output $V_{PP}$ 110 is higher than a trickle charge voltage threshold $V_{TR}$ 328 shown as a line 312 in the voltage versus time plot 300. Between a voltage $V_{UVLH}$ 330 and the trickle charge voltage threshold $V_{TR}$ 328, the battery 118 charges in a trickle charge TR mode 310. As is known in the art, a trickle charge process usually occurs at a fraction of the total charge value of the battery 118, to compensate for losses due to phenomena like self-discharge.

As soon as the battery 118 attains a voltage corresponding to a charge value that is higher than the trickle charge voltage threshold $V_{TR}$ 328, at a time t 306, the second transistor 116 turns ON resulting in a sharp voltage drop shown by the curve 324. The voltage drop shown by the curve 324 leads to disruptions in the output power of the device connected to the battery 118. For example, due to the sudden turn ON of the second transistor 116, in a cell phone device, there might be a sudden drop in the audio output from the cell phone speaker/ear-piece. After the voltage drop shown by the curve 324, the battery 118 starts recharging back to a value higher than the trickle charge voltage threshold $V_{TR}$ 328 as shown by the curve 322. Extending the curve 322 below the value $V_{UVLH}$ 330 shown by line 314 in the voltage versus time plot 300 shows that curve 322 originates from a value of the voltage $V_{MBAT}$ 124 corresponding to the actual voltage value the battery 118 was at before the charging process was initiated.

To avoid the above mentioned discontinuity in the output power of the device due to a sudden change in the battery voltage level, a discharge test is performed. This test procedure is built in a power management unit, external to the Battery Protection Circuit 100, that is a part of the mobile device to which the battery 118 of FIG. 1 is supplying power to. There is provided a provision for communication between the external power management unit and the Battery Protection Circuit 100 of FIG. 1.

Figure 4:
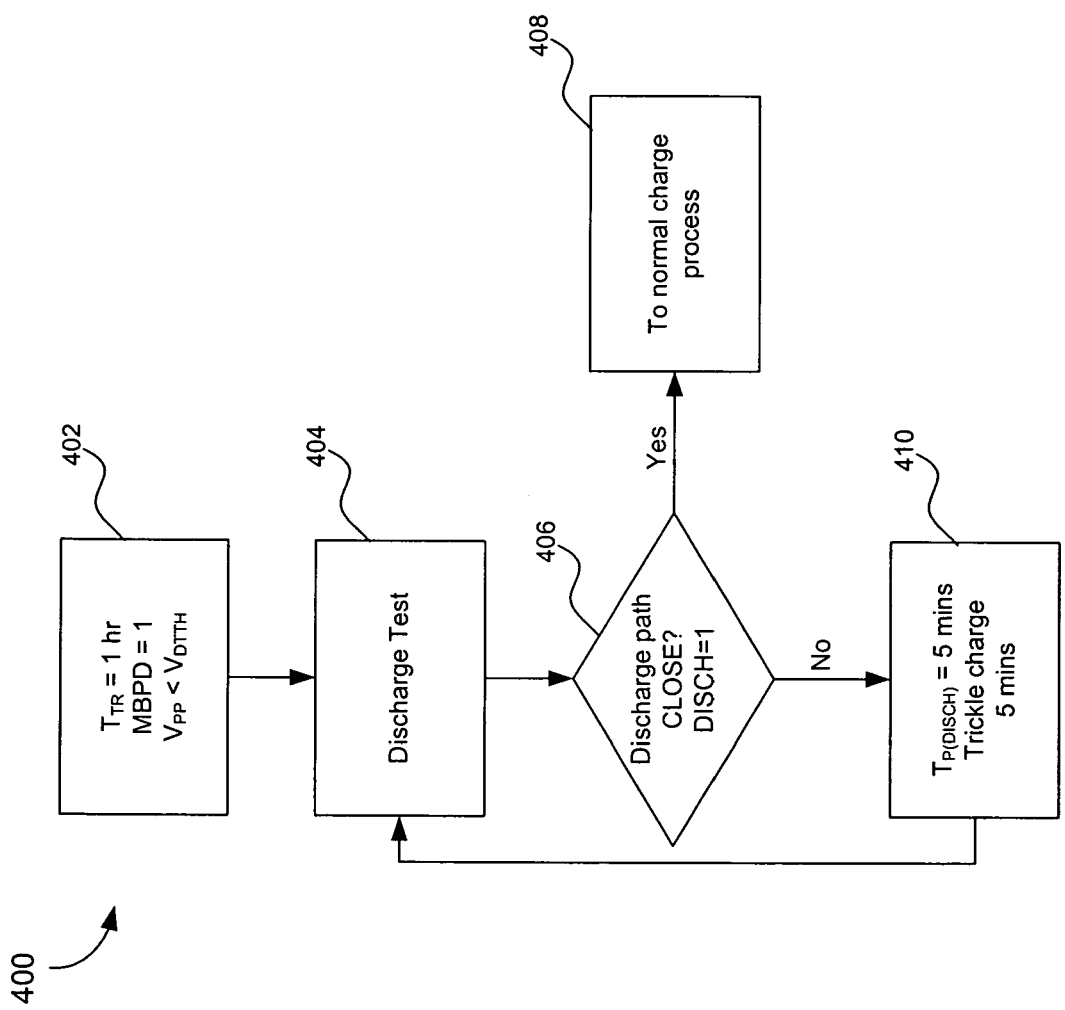
FIG. 4 illustrates a test flow chart to determine the charging technique to use.

FIG. 4 shows a flowchart 400 that performs a discharge test. In step 402 a trickle charge timer $T_{TR}$ is set to an expire time, usually 1 hour (but other expiration times are contemplated). As a preliminary step, the external power management unit checks if a battery 118 is present or not, in the first place, by detecting a thermal resistance. If a battery 118 is detected, the external power management unit checks for the value of the peak voltage output $V_{PP}$ 110. Only if the value of the peak voltage output $V_{PP}$ 110 is less than a discharge test threshold voltage $V_{DTTH}$, does a charge controller perform a discharge test, as shown in step 404. According to one embodiment of the present invention, the value of the discharge test threshold voltage $V_{DTTH}$ is set in the range of 2.0 volts to 2.5 volts. It is to be noted that depending upon the type of application and the type of the battery 118 of FIG. 1, other values of the discharge test threshold voltage $V_{DTTH}$ can also be selected.

In step 404, a discharge step is performed by the external power management unit. It involves the following steps:

(a) turning off the Battery Pack 102 and then discharging the battery 118 of FIG. 1.

(b) if the second transistor 116 is OFF, the peak voltage output $V_{PP}$ 110 will be 0 volts when the battery 118 is being discharged.

(c) if the second transistor 116 is ON, the peak voltage output $V_{PP}$ 110 will be the real battery voltage equal to $V_{MBAT}$ 124 of FIG. 1. In this case a discharge path is closed, as can also be seen from FIG. 2A.

In step 406, if the discharge path is closed, a normal charging procedure is followed according to step 408. If the discharge path is not closed, a discharge test period $T_{P(DISCH)}$ is set equal to 5 minutes and the battery 118 is trickle charged for that duration of time, according to step 410 of the flowchart 400. After the $T_{P(DISCH)}$ time period expires, control moves back to step 404 where the conditions set forth in the steps 404 and 406 are repeated till the discharge path, as mentioned in step (c) of step 404, is closed, such that control passes to step 408.

By means of the test procedure described in flowchart 400, the discontinuities in the output of the mobile device due to charging of the battery 118 are avoided.

It is to be appreciated that the Detailed Description section, and not the Summary and Abstract sections, is intended to be used to interpret the claims. The Summary and Abstract sections may set forth one or more but not all exemplary embodi-

What is claimed is:

1. A battery protection system for charging a battery at different voltages contingent upon a discharge level of said battery, comprising:
    a first transistor and a first diode providing a charge path for said battery to be charged by a voltage source;
    a second transistor and a second diode providing a discharge path for said battery; and
    a protector IC configured to open and close both the charge path and the discharge path; and
    a power management unit configured to:
        determine if an output voltage of said battery is less than a discharge threshold voltage, and upon such a determination:
        determine if the discharge path is closed, and upon such a determination charge said battery with a normal charging voltage; and
        determine if the discharge path is open, and upon such a determination charge said battery using a trickle charge.

2. The battery protection circuit of claim 1, wherein a positive terminal of the battery is connected to a source of the second transistor.

3. The battery protection circuit of claim 1, wherein a source of the first transistor is connected to the voltage source, wherein the voltage of the voltage source is a peak output voltage to which the battery may be charged.

4. The battery protection circuit of claim 1, wherein an anode of the first diode is connected to a drain of the first transistor and a cathode of the first diode is connected to the source of the first transistor.

5. The battery protection circuit of claim 1, wherein an anode of the second diode is connected to a drain of the second transistor and a cathode of the second diode is connected to the source of the second transistor.

6. The battery protection circuit of claim 1, wherein said first and second transistors are Field Effect Transistors (FETs).

7. The battery protection circuit of claim 1, wherein said first and second transistors are Bipolar Junction Transistors (BJTs).

8. The battery protection circuit of claim 1, wherein the circuit is in an overcharge mode when the first transistor is ON and the second transistor is OFF.

9. The battery protection circuit of claim 1, wherein the circuit is in a deep discharge mode when the first transistor is OFF and the second transistor is ON.

10. A method to charge a battery, comprising:
    comparing an output voltage of the battery to a discharge threshold voltage;
    upon a determination that the output voltage is less than the discharge threshold voltage, performing a battery discharge test, wherein the battery discharge test determines if a discharge path configured to discharge the battery is closed to permit discharging or open to prevent discharging;
    upon a determination that the discharge path is closed, charging the battery with a normal charging voltage; and
    upon a determination that the discharge path is open, charging the battery using a trickle charge.

11. The method of claim 10, further comprising:
    detecting if the battery is present.

12. The method of claim 11, further comprising:
    detecting if the battery is present by detecting a thermal resistance.

13. The method of claim 10, further comprising repeating a charge cycle comprising:
    charging the battery using a trickle charge for the duration of a test period;
    upon completion of the test period, repeating the battery discharge test, and upon a repeated determination that the discharge path is open, charging the battery using the trickle charge.

14. The method of claim 13, further comprising:
    repeating the charge cycle until the determination is made that the discharge path is open; and
    upon the determination that the discharge path is closed, charging the battery with the normal charging voltage.

15. The method of claim 13, wherein the test period is approximately five minutes.

16. The method of claim 10, wherein the discharge threshold value is approximately 2 Volts.

* * * * *